United States Patent
Puig et al.

(10) Patent No.: US 8,548,653 B2
(45) Date of Patent: Oct. 1, 2013

(54) METHOD AND SYSTEM FOR AIDING THE PILOTING OF AN AIRPLANE DURING AN APPROACH

(75) Inventors: Stéphane Puig, Lauzerville (FR); Martin Delporte, Fonsorbes (FR); Jérôme Gauvain, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 0 days.

(21) Appl. No.: 13/479,479

(22) Filed: May 24, 2012

(65) Prior Publication Data
US 2012/0303186 A1 Nov. 29, 2012

(30) Foreign Application Priority Data
May 26, 2011 (FR) ...................................... 11 54597

(51) Int. Cl.
*G06F 19/00* (2011.01)
(52) U.S. Cl.
USPC .......................................................... 701/18
(58) Field of Classification Search
USPC ............. 701/3, 4, 6, 8–9, 11, 12, 16, 18, 301, 701/302
See application file for complete search history.

(56) References Cited

U.S. PATENT DOCUMENTS

| | | | |
|---|---|---|---|
| 5,901,927 A * | 5/1999 | Ho | 244/183 |
| 6,121,899 A * | 9/2000 | Theriault | 340/967 |
| 2009/0195413 A1 | 8/2009 | Constans | |

FOREIGN PATENT DOCUMENTS
FR 2902081 12/2007

OTHER PUBLICATIONS

French Patent Office, Preliminary Search Report for FR 1154597, Feb. 16, 2012 (2 pgs.).

* cited by examiner

*Primary Examiner* — Kim T Nguyen
(74) *Attorney, Agent, or Firm* — Wood, Herron & Evans, LLP

(57) ABSTRACT

A system for aiding piloting of an airplane during a final approach includes current roll angle sensors that measures a current roll angle of the airplane, and a maximum roll angle calculation device that calculates a limit roll angle corresponding to a maximum roll angle at which an end point of the airplane will not strike the ground. The system also includes a display for automatically presenting on a single screen a first characteristic sign illustrating the current roll angle and a second characteristic sign illustrating the limit roll angle. If a potential ground collision is presented by too high of a current roll angle, an alarm may be emitted or automatic control of the airplane may occur to correct the roll angle.

15 Claims, 2 Drawing Sheets

METHOD AND SYSTEM FOR AIDING THE PILOTING OF AN AIRPLANE DURING AN APPROACH

TECHNICAL FIELD

The present invention relates to a method and system for aiding the piloting of an airplane upon an approach to an airport with a view to a landing, in particular upon a flare phase.

BACKGROUND

In the framework of the present invention, the term flare phase means a righting phase for an airplane generally preceding a landing. It is known that risks of coming into contact with the ground with a part of the canopy or a part of the engines can exist upon such phase.

During the flare phase, the pilot must focus on the attitude angles of the airplane, namely the attitude, the roll and the heading. He must also focus on keeping the airplane in the axis of the runway and limiting the load applied to the airplane upon the contact with the ground.

When the airplane is close to the ground, it may meet blustering wind and the direction thereof may change. The crew must be conscious that, upon the approach phase, and specifically upon the flare phase, side wind may suddenly change the attitude and the roll, thereby resulting in a tail strike, but also a sideslip. Such events may also lead to roll variations, side deviations, and then potentially canopy strikes and/or turn-offs. Side wind may moreover generate a turn-off, which leads to a roll angle being modified in an aerodynamic way.

The main effects of a ground strike are degradations of canopy edges and engines, with possibly effects on the airplane safety.

A canopy strike may sometimes be the consequence of a too large roll compensation realized so as to avoid a turn-off. The pilot should thus find the better compromise between the side deviations, the airplane control and the strikes of airplane members with the ground, which represents a large work load.

An object of the present invention aims at remedy the above mentioned disadvantages. It relates to a method for aiding the piloting of an airplane, in particular upon a flare phase, which allows to detect (in real time) aboard the plane a risk of collision of canopy members with the ground.

SUMMARY OF THE INVENTION

With this end in view, according to the invention, the method is remarkable in that the following succession of steps is carried out on an automatic and repetitive way, the method including:

a) determining the current values of an airplane height relative to the ground and a pitch angle of the airplane;
b) from such current values and geometrical data being representative of the airplane and related to an end point of the latter, calculating a limit roll angle, which is a maximum roll angle up to the value for which is guaranteed that the end point of the airplane will not strike the ground;
c) determining the current value of the roll angle of the airplane; and
d) presenting on a single display a first characteristic sign illustrating the current value of the roll angle and a second characteristic sign illustrating the limit roll angle.

Thus, thanks to the invention, it is possible to establish at any time upon the approach (more precisely upon the final phase of the approach and the landing, as detailed hereinunder) the roll limit due to the geometry of the airplane and the current situation (height, pitch) of the airplane, i.e. the limit roll angle that the airplane can reach with no particular end point of the canopy (wing, engine) coming into contact with the ground. Moreover, such value is displayed on a screen in the cockpit of the airplane, together with the current value of the roll angle, allowing the pilot to have an exact representation of the possible risk of a ground strike (by comparing these two characteristic signs).

The present invention also enables in such a way to increase safety upon an approach.

In a preferred embodiment, at step b), said limit roll angle $\phi_{lim}$ is calculated by means of the following expressions:

$$\cos^2\phi_{lim} = (-b + \sqrt{b^2 - 4ac})/2a$$

with:

$$a = Y_1^2 + (HRA + Z_2 - Z_1)^2$$

$$b = 2tg\theta(HRA + Z_2 - Z_1)X_1$$

$$c = tg^2\theta X_1^2 - Y_1^2$$

wherein:
- tg represents the tangent:
- $\theta$ is the pitching angle of the airplane;
- HRA is the airplane height relative to the ground, being measured by a radio-altimeter along a measurement direction;
- $Z_2$ is the distance along said measurement direction between the centre of gravity of the airplane and the measurement point of the altimeter; and
- $X_1, Y_1$ and $Z_1$ are geometrical data being representative of said airplane and correspond to the distances between the centre of gravity and said end point, respectively along the three (rotational) axes of a fix bound to the airplane.

Furthermore, advantageously, in a further step, the current value of the roll angle is automatically compared to the sum of the limit roll angle and a predetermined margin. In such a case, if the current value of the roll angle is higher than the sum;
- in a first embodiment, an alarm message is emitted, allowing to warn the pilot about the situation of striking the ground; and
- in a second embodiment (alternatively or additionally), the airplane is automatically controlled so that the current value of the roll angle becomes again lower than or equal to the sum. Such automatic control relieves the pilot of any action to come back in a roll secure position.

Moreover, in a particular embodiment:
- at step b), an estimation of a future value of the roll angle of the airplane is in addition carried out; and
- at step d), a third characteristic sign illustrating said future value of the roll angle is additionally presented on said screen.

Preferably, at step b), said future value of the roll angle is calculated from the derivative of the current value of the roll angle of the airplane and a predetermined prediction time.

It is also possible to use such estimation of a future value on the roll angle of the airplane to automatically detect an excessive roll future situation, and in such a situation to detect an alarm signal and/or an automatic control, such as the ones above mentioned.

Moreover, advantageously, upon the approach, the current value of the airplane height is automatically and repetitively determined relative to the ground, such current value is compared to a predetermined height value, and said steps b) to d) are implemented, as soon as said current height becomes lower than said predetermined height value, for example 40 meters.

The present invention is applied to an end point corresponding to the airplane point being able to first strike the ground upon an excessive roll. Such an end point can be a wing tip or an engine pod end. However, in a preferred embodiment applied for an airplane provided with engines arranged under the wings thereof, advantageously, two following end points are taken into account: one wing tip and one engine pod end, and said steps b) and d) are implemented for both end points, and then the most penalizing value is kept, and this, as a function of current flight parameters (attitude and roll) of the airplane.

The present invention also relates to an aiding system for the piloting of an airplane upon an approach, in particular upon a flare phase.

According to the invention, the system comprises:
  a set of information sources to automatically determine the current values of an airplane height relative to the ground and of a pitch angle of the airplane;
  a maximum roll angle calculation device that automatically calculates, from such current values and geometrical data being representative of the airplane and related to an end point of the airplane, a limit roll angle, which is a maximum roll angle up to the value for which is guaranteed that the end point of the airplane will not strike the ground;
  current roll angle sensors that automatically determine the current value of the airplane roll angle; and
  a display, which is able to automatically present, on a single screen, simultaneously a first characteristic sign illustrating the current value of the roll angle and a second characteristic sign illustrating the limit roll angle.

Furthermore, advantageously, said system comprises additionally:
  a comparison device that automatically compares the current value of the roll angle to the sum of the limit roll angle and a predetermined margin;
  alarm devices that automatically emit an alarm message if the current value of the roll angle is higher than the latter sum; and/or
  an automatic flight control mechanism that automatically controls the airplane if the current value of the roll angle is higher than the limit roll angle, so as to bring the current value of the roll angle back to a value being lower than or equal to the sum. It can be an automatism tending to bring the airplane back to an envelope fixed by the limit roll, and this through the roll surfaces.

The present invention further relates to an airplane, in particular a transport airplane, being provided with a system as above mentioned.

BRIEF DESCRIPTION OF THE DRAWINGS

The FIGS. of the accompanying drawing will make well understood how the invention can be implemented. On such FIGS., identical reference annotations designate similar elements.

DETAILED DESCRIPTION

Figure 1:
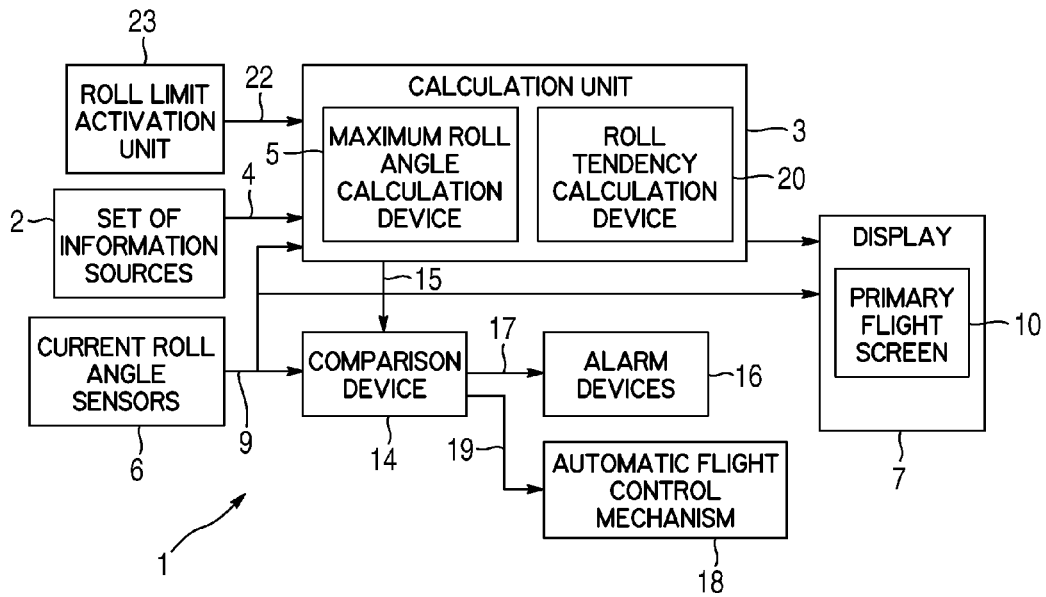
FIG. 1 is the block diagram of a system for aiding piloting according to the invention.

The system 1 according to the invention and schematically represented on FIG. 1 is intended for aiding a pilot of an airplane AC, in particular a transport airplane, to pilot the airplane AC upon an approach phase, and more specifically during the flare phase, upon a landing to an airport runway. More precisely, it enables including to detect a risk of collision for canopy members with the ground.

Figure 3:
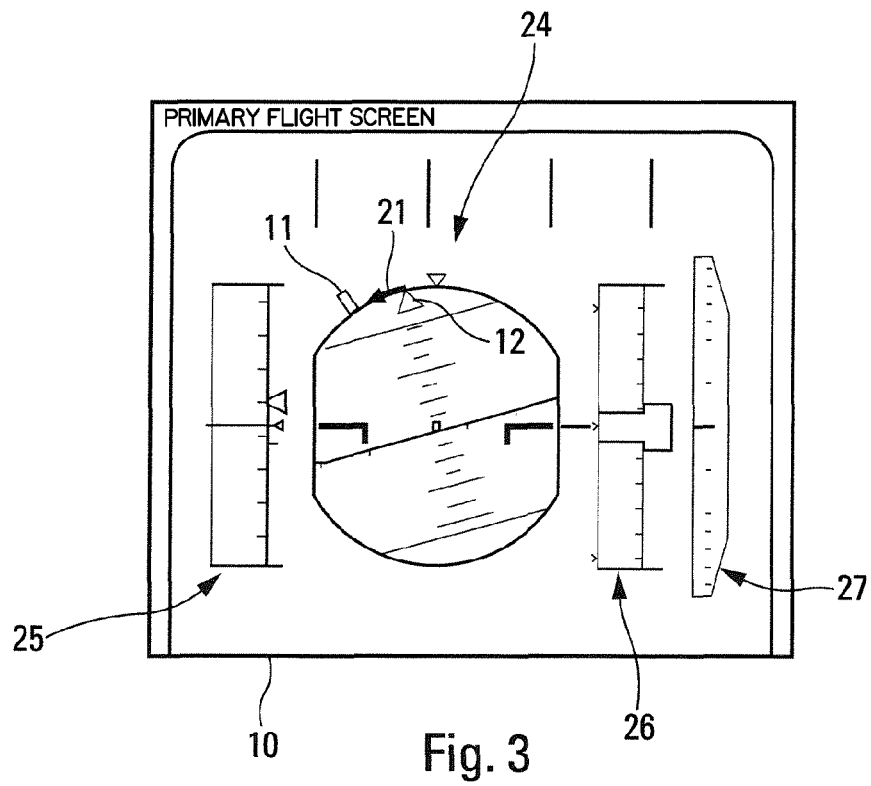
FIGS. 3 and 4 illustrate displays being able to be implemented by a piloting aiding system according to the invention, respectively in a situation without any risk of striking and a risky situation.
Figure 4:
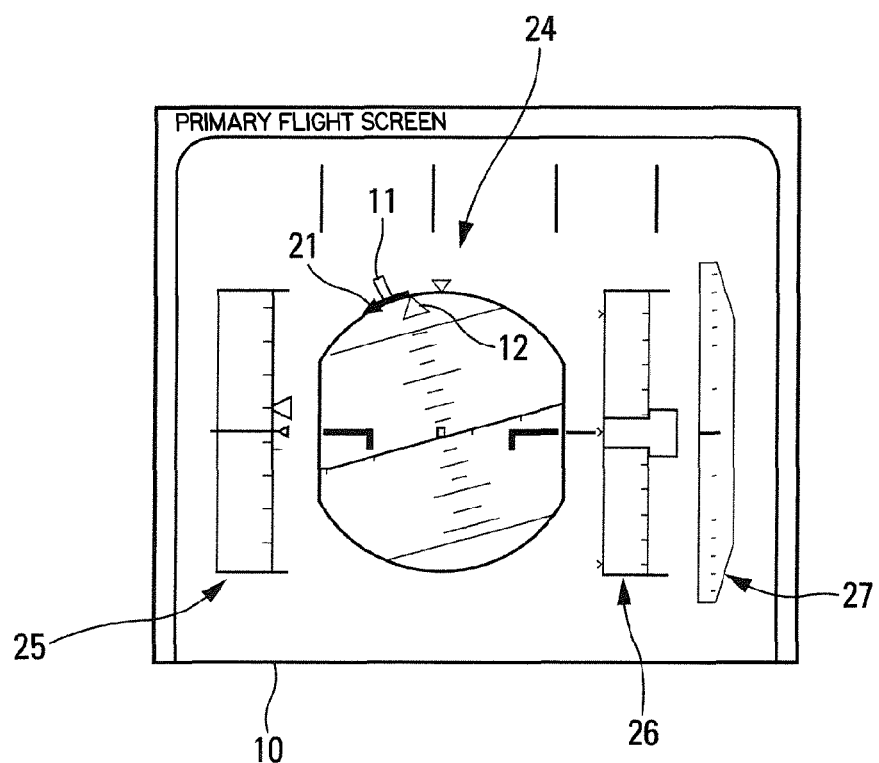

To do so, the system 1 being embedded aboard the airplane AC and operating in real time, comprises:
  a set 2 of information sources to automatically determine the current value of a height of the airplane AC relative to the ground and the current value of a pitch angle of the airplane;
  a calculation unit 3 being connected through a connection 4 to the set 2 of information sources and comprising a maximum roll angle calculation device 5 that automatically calculates, from current values received from the set 2 and the geometrical data representative of the airplane AC and related to a limit roll angle $\phi_{lim}$ being a maximal roll angle up to the value for which is guaranteed that the end point P1, P2 of the airplane AC will not strike the ground;
  a current roll angle sensor 6 for automatically determining the current value of the roll angle of the airplane AC; and
  a display 7 being connected thru connections 8 and 9, respectively to the calculation unit 3 and to the current roll angle sensor 6 and being adapted to automatically present, on a single screen 10, simultaneously a characteristic sign 11 (for example under the shape of a bar or a herringbone) illustrating the limit roll angle and a characteristic sign 12 (for example under the shape of a triangle) illustrating the current value of the roll angle, as represented on FIGS. 3 and 4.

In a particular embodiment, said screen 10 is a primary flight screen of the PFD ("Primary Flight Display") type.

Furthermore, the set 2 of information sources comprises the following devices (not represented individually):
  at least one usual radiometer to determine the current value of the height of the airplane AC relative to the ground; and
  the following sensors: pressure sensors, accelerometers, gyrometers, GPS sensors, incidence probes and sideslip probes.

Thus, the system 1 according to the invention is able to establish at any time upon the approach (more precisely upon the final phase of the approach and the landing) in real time, the roll limit due to the geometry of the airplane AC and the current situation (height, pitch) of the airplane AC, i.e. the limit roll angle, that the airplane can reach without any particular end point of the canopy coming into contact with the ground. Moreover, such value is displayed on a screen 10 within the cockpit of the airplane AC, together with the current value of the roll angle, allowing the pilot to get an exact representation of the possible risk of ground striking (by comparing such two characteristic signs 11 and 12).

Figure 2:
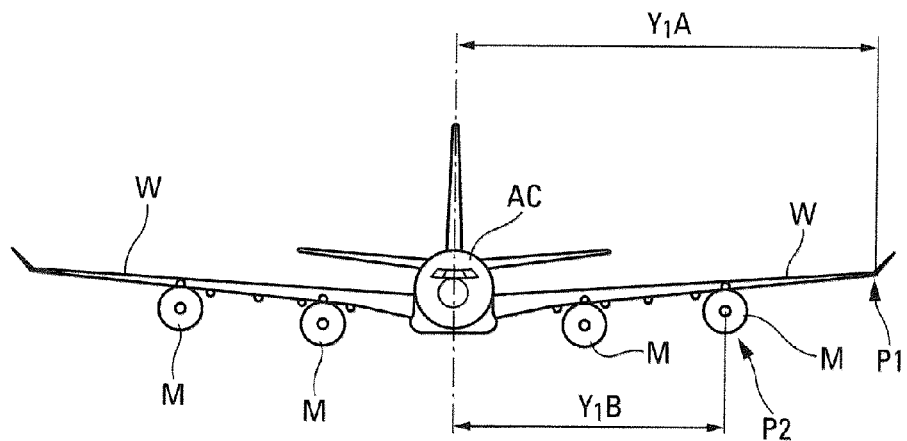
FIG. 2 schematically shows an airplane, to which the piloting aiding system according to the invention is applied.

The limit roll angle corresponds, as detailed hereinunder:
  either to the tips P1 of the wings W ("wing tip") of the airplane AC;
  or to the low ends P2 of the pods of the (external) engines M mounted under the wings of the airplane AC, as represented on FIG. 2.

The calculation principle implemented by the maximum roll angle calculation device 5 is of a geometrical type and it takes three input variables into account: the pitch angle (θ), the roll angle (φ) and the radio altitude HRA of the airplane AC (generally measured at the level of the landing gear). Proper constants for the airplane AC are to be determined and to be provided to the maximum roll angle calculation device 5. These variables are necessary to calculate the position of the wing tip or the engine pod end relative to the rotation axes of the airplane AC.

In a preferred embodiment, the maximum roll angle calculation device 5 calculate the limit roll angle $\phi_{lim}$ by means of the following expressions:

$$\cos^2\phi_{lim} = (-b + b^2 - 4ac)/2a$$

with:

$$a = Y_1^2 + (HRA + Z_2 - Z_1)^2$$

$$b = 2tg\theta(HRA + Z_2 - Z_1)X_1$$

$$c = tg^2\theta X_1^2 - Y_1^2$$

wherein:
tg represents the tangent:
θ is the pitch angle of the airplane;
HRA is the airplane height relative to the ground, being measured by a radio-altimeter along a measurement direction;
$Z_2$ is the distance along said measurement direction between the centre of gravity of the airplane and the measurement point of the altimeter; and
$X_1, Y_1$ and $Z_1$ are geometrical data being representative of said airplane and correspond to the distances between the centre of gravity and said end point, respectively along the three (rotational) axes of a fix bound to the airplane.

Hereinunder, the definition of the limit roll angle $\phi_{lim}$ is presented:

A/ in a first time, the vector corresponding to the end point to be checked is defined. The wings or the engines can be thus checked. In the airplane fix, such vector presents the following components: $X_1, Y_1$ and $Z_1$ in the airplane fix. On FIG. 2, there are represented the values $Y_{1A}$ and $Y_{1B}$ with the $Y_1$, respectively for the wing tip P1 and for the pod end P2 of the external engine M being the farthest from the longitudinal axis of the airplane AC.

The height H between the centre of gravity of the airplane AC (relative to which the airplane fix is defined) and the ground corresponds to the following value:

$$H = [Z_2 + HRA] \cdot \cos\theta \cdot \cos\phi$$

$Z_2$ being the distance along said measurement direction between the centre of gravity of the airplane AC and the measurement point of the radioaltimeter, which is generally located in the vicinity of the landing gear.

B/ Calculation of the maximum angle

It is convenient to calculate the maximum rolls admitted by the projection of the external pod and the wing tip on the plane.

A strike occurs when the height, in the ground fix, of the wing tip vector is equal to the height between the centre of gravity and the ground. It is thus obtained:

$$HRA \cos\theta \cos\phi + \cos\theta \cos\phi_{lim} Z_2 = \cos\theta \sin\phi_{lim} Y_1 - \sin\theta X_1 + \cos\theta \cos\phi_{lim} Z_1$$

$$\sin\phi Y_1 = tg\theta X_1 + \cos\phi(HRA + Z_2 - Z_1)$$

By making a variable change and squaring such equation, the following solution is obtained:

$$aX^2 + bX + c = 0$$

with:

$$X = \cos^2\varphi_{lim} = \frac{-b + \sqrt{b^2 - 4ac}}{2a}$$

$$a = Y_1^2 + (HRA + Z_2 - Z_1)^2$$

$$b = 2tg\theta(HRA + Z_2 - Z_1)X_1$$

$$c = tg^2\theta X_1^2 - Y_1^2$$

Furthermore, in a first embodiment, the system comprises in addition:
a comparison device 14 to automatically compare the current value of the roll angle (received by the connection 9 of the current roll angle sensors 6 with the sum of the limit roll angle (received by a connection 15 of the calculation unit 3) and a predetermined margin; and
alarm devices 16, which are connected through a connection 17 to the comparison device 14 and emit an alarm message (sound and/or visual) intended to warn a pilot of a risky situation of striking, e.g., where the current value of the roll angle is higher than the sum.

Moreover, in a second embodiment (alternatively or in addition to the first embodiment), the system comprises in addition to the comparison device 14 to automatically compare the current value of the roll angle with the sum of the limit roll angle and a predetermined margin, an automatic flight control mechanism 18 (connected by a connection 19 to the comparison device 14 in order to automatically control the airplane AC so that the current value of the roll angle becomes again lower than or equal to the sum. Such automatic control releases the pilot of any action to come back to a roll secure position, by automatically bringing the roll angle back to the limit, in case of an excess.

Furthermore, in a particular embodiment, the calculation unit 3 additionally comprises a roll tendency calculation device 20 to perform an estimation of a future value of the roll angle of the airplane AC. In such a case, the display 7 presents in addition on the screen 10 a characteristic sign 21 (preferably an arrow indicating the pending evolution) illustrating the future value of the roll angle (corresponding to the arrow tip on the roll scale).

Such display of a roll tendency (predicted roll in a near future) allows the pilot to know the margin with respect to the limit and the potential excursions. He can thus be able to identify the risk level.

Preferably, said means the roll tendency calculation device 20 calculates said future value of the roll angle from the derivative of the current value of the roll angle of the airplane, being usually determined with devices being, for example, part of the set 2 of information sources, and a predetermined prediction time, for instance a few seconds.

Such roll tendency thus gives, in association with the limit roll angle and the current roll angle, margin information being operational for the pilot.

Within the present invention, alarm devices 16 and the automatic flight control mechanism 18 can be associated:
with the single roll excess being detected from the current roll; and
with the single roll excess being detected from the future value of the roll angle; or preferably simultaneously with two possible roll excesses (related to the current value, and the future value of the roll angle).

Furthermore, in a particular embodiment, the system 1 comprises moreover a roll limit activation unit 23 including for activating the calculation unit 3 (via a connection 22) so as to determine the limit roll angle. Such activation unit 23 comprises the following devices (not individually represented):

- a sensor for determining, upon the approach, automatically and repetitively, the current value of the height of the airplane AC relative to the ground;
- a device for comparing such current value to a predetermined height value; and
- a device for generating the activation as soon as the current height becomes lower than the predetermined height value, for example 40 meters.

The limit roll information can be displayed in the cockpit, inter alia on the primary flight screen, on a usual roll scale 24, as represented on FIGS. 3 and 4. On these FIGS. 3 and 4, a usual air speed scale 25, a usual altitude scale 26, and a usual vertical speed 27 are also represented. Such limit roll is displayed on the roll scale 24 under the form of the characteristic sign 11 (bar or herringbone). This allows the pilot to be informed when the current roll (characteristic sign 12) exceeds the limit roll indicator (sign 11).

The future roll is displayed under the form of a tendency arrow 21 being displayed superimposed on the roll information being already displayed in a dynamic way in the cockpit. From the predicted roll angle and limit roll level, the pilot is thus able to identify the risk level. On the example of FIG. 3, no risk appears, whereas, on the example of FIG. 4, the tendency arrow 21 (predicted roll angle) exceeds the authorized limit (sign 11).

The system 1 according to the invention allows thus detecting in real time aboard the airplane AC a risk of collision in canopy members with the ground. It enables to display a limit roll to be observed. Depending on the current roll level and the tendency thereof, the pilot can identify the margins and the risks so as to react accordingly. Such limit can also generate an alarm (or an automatic control) if the airplane AC exceeds it.

The invention claimed is:

1. An aiding method for piloting of an airplane upon an approach phase to an airport, wherein the following succession of steps is carried out on an automatic and repetitive way, the method comprising:
   a) determining, with a set of information sources including sensors on the airplane, a current height of the airplane relative to ground and a current pitch angle of the airplane;
   b) from the current height and the current pitch angle and geometrical data being representative of the airplane and related to an end point of the airplane, calculating, with a maximum roll angle calculation device on the airplane, a limit roll angle, which is a maximum roll angle at which the end point of the airplane will not strike the ground, the limit roll angle $\phi_{lim}$ being calculated by:

$$\cos^2 \phi_{lim} = (-b + \sqrt{b^2 - 4ac})/2a$$

with:

$$a = Y_1^2 + (HRA + Z_2 - Z_1)^2$$

$$b = 2 tg\theta (HRA + Z_2 - Z_1) X_1$$

$$c = tg^2\theta X_1^2 - Y_1^2$$

wherein:
   - tg represents a tangent;
   - $\theta$ is the current pitch angle of the airplane;
   - HRA is the current height of the airplane relative to the ground, being measured by a radio-altimeter according to a measurement direction;
   - $Z_2$ is a distance along the measurement direction between a centre of gravity of the airplane and a measurement point of the radio-altimeter; and
   - $X_1, Y_1$ and $Z_1$ are geometrical data being representative of the airplane and correspond to distances between the centre of gravity of the airplane and the end point, respectively along three axes of movement relative to the airplane;

c) determining a current roll angle of the airplane with current roll angle sensors on the airplane; and
   d) presenting on a single screen on the airplane a first characteristic sign illustrating the current roll angle and a second characteristic sign illustrating the limit roll angle.

2. The method according to claim 1, further comprising:
   automatically and repetitively comparing, with a comparison device, the current roll angle to a sum of the limit roll angle and a predetermined margin, and
   emitting, with alarm devices, an alarm message if the current roll angle is higher than the sum.

3. The method according to claim 1, further comprising:
   automatically and repetitively comparing, with a comparison device, the current roll angle to a sum of the limit roll angle and a predetermined margin, and,
   if the current roll angle is higher than the sum, automatically controlling the airplane, with an automatic flight control mechanism, so that the current roll angle is modified to become lower than or equal to the sum.

4. The method according to claim 1, further comprising:
   at step b), estimating, with a roll tendency calculation device, a future value of roll angle of the airplane; and
   at step d), presenting on the single screen a third characteristic sign illustrating the future value of roll angle of the airplane.

5. The method according to claim 4, further comprising:
   at step b), calculating, with the roll tendency calculation device, the future value of the roll angle from a derivative of the current roll angle of the airplane and a predetermined prediction time.

6. The method according to claim 1, further comprising:
   upon an approach, automatically and repetitively determining, with the set of information sources, the current height of the airplane relative to the ground,
   comparing the current height to a predetermined height value, and
   initiating, with a roll limit activation unit, the steps b) to d), as soon as the current height becomes lower than the predetermined height value.

7. The method according to claim 1, wherein the airplane includes engines arranged under the wings, wherein the end point includes both one wing tip and one engine pod end, and the method further comprises:
   implementing the steps b) and d) for both the one wing tip and the one engine pod end as end points, such that a lowest limit roll angle is displayed and stored as a function of current flight parameters of the airplane.

8. An automatic aiding system for piloting of an airplane upon an approach phase to an airport, the system comprising:
- a set of information sources including sensors on the airplane that automatically determine a current height of the airplane relative to ground and a current pitch angle of the airplane;
- a maximum roll angle calculation device on the airplane that automatically calculates, from the current height and the current pitch angle and geometrical data being representative of the airplane and related to an end point of the airplane, a limit roll angle, which is a maximum roll angle at which the end point of the airplane will not strike the ground, the limit roll angle $\phi_{lim}$ being calculated by:

$$\cos^2\phi_{lim}=(-b+\sqrt{b^2-4ac})/2a$$

with:

$$a=Y_1^2+(HRA+Z_2-Z_1)^2$$

$$b=2tg\theta(HRA+Z_2-Z_1)X_1$$

$$c=tg^2\theta X_1^2-Y_1^2$$

wherein:
- tg represents a tangent;
- $\theta$ is the current pitch angle of the airplane;
- HRA is the current height of the airplane relative to the ground, being measured by a radio-altimeter according to a measurement direction;
- $Z_2$ is a distance along the measurement direction between a centre of gravity of the airplane and a measurement point of the radio-altimeter; and
- $X_1, Y_1$ and $Z_1$ are geometrical data being representative of the airplane and correspond to distances between the centre of gravity of the airplane and the end point, respectively along three axes of movement relative to the airplane;
- current roll angle sensors on the airplane that automatically determine a current roll angle of the airplane; and
- a display on the airplane including a single screen that automatically presents a first characteristic sign illustrating the current roll angle and a second characteristic sign illustrating the limit roll angle.

9. The system according to claim 8, wherein the single screen includes a primary flight screen in a cockpit.

10. The system according to claim 8, wherein the set of information sources comprises at least one radio-altimeter to determine the current height relative to the ground.

11. The system according to claim 8, further comprising:
- a comparison device that automatically compares the current roll angle to a sum of the limit roll angle and a predetermined margin, and
- alarm devices that automatically emit an alarm message if the current roll angle is higher than the sum.

12. The system according to claim 8, further comprising:
- a comparison device that automatically compares the current roll angle to a sum of the limit roll angle and a predetermined margin, and
- an automatic flight control mechanism that automatically controls the airplane if the current roll angle is higher than the sum, so as to modify the current roll angle back to being lower than or equal to the sum.

13. An airplane comprising the system of claim 8.

14. The system according to claim 8, further comprising:
- a roll tendency calculation device that estimates a future value of roll angle of the airplane from a derivative of the current roll angle of the airplane and a predetermined prediction time, such that the single screen of the display also presents the future value of toll angle of the airplane.

15. The system according to claim 8, further comprising:
- a roll limit activation unit that compares the current height of the airplane with a predetermined height value and initiates operation of the maximum roll angle calculation device, the current roll angle sensors, and the display when the current height becomes lower than the predetermined height value.

* * * * *